United States Patent
Friedman et al.

(10) Patent No.: US 6,212,600 B1
(45) Date of Patent: Apr. 3, 2001

(54) METHOD AND APPARATUS FOR SANITIZATION OF FIXED STORAGE DEVICES

(75) Inventors: George Friedman; David Earl Marshall; Robert Phillip Starek, all of Austin; Jay R. Nelson, San Antonio, all of TX (US)

(73) Assignee: Infraworks Corporation, Austin, TX (US)

( * ) Notice: Subject to any disclaimer, the term of this patent is extended or adjusted under 35 U.S.C. 154(b) by 0 days.

(21) Appl. No.: 09/010,262

(22) Filed: Jan. 21, 1998

(51) Int. Cl.$^7$ .................................................. G06F 12/14
(52) U.S. Cl. ........................ 711/112; 360/60; 713/200
(58) Field of Search ............................. 380/3, 4; 360/60, 360/48; 711/111, 112; 713/2, 200, 202, 193; 705/57

(56) References Cited

U.S. PATENT DOCUMENTS 5,265,159 * 11/1993 Kung ........................................ 380/4
5,794,032 * 8/1998 Leyda ...................................... 713/2
5,884,026 * 3/1999 Kong ..................................... 713/202

OTHER PUBLICATIONS

"The Norton Utilities Advanced Edition, Version 4.5", pp. 1, 208–211, 1988.*
"The Norton Trouble–Shooting Guide For Disks", pp. 4–7, 1988.*
Guttman, "Secure Deletion of Data From Magnetic and Solid–State Memory," 6th Usenix Security Symposium Proceedings, Jul. 1996.*

* cited by examiner

Primary Examiner—Do Yoo
Assistant Examiner—Gary J. Portka
(74) Attorney, Agent, or Firm—Schnader Harrison; Segal & Lewis LLP

(57) ABSTRACT

A method and apparatus are disclosed for sanitization of a fixed storage device interfaced to a computer system. The computer system is booted from a removable storage device that holds a bootable disk operating system and program code that is executed within the disk operating system. The fixed storage device is detected. The writeable space of the fixed storage device is then overwritten with a plurality of overwrite layers. Further, a report can be printed listing information about the sanitization process contemporaneously upon the completion of sanitization. In one embodiment, sanitizing is accomplished using a plurality of patterns, each layer having an associated pattern, to ensure that data can not be recovered even by destructive analysis.

23 Claims, 2 Drawing Sheets

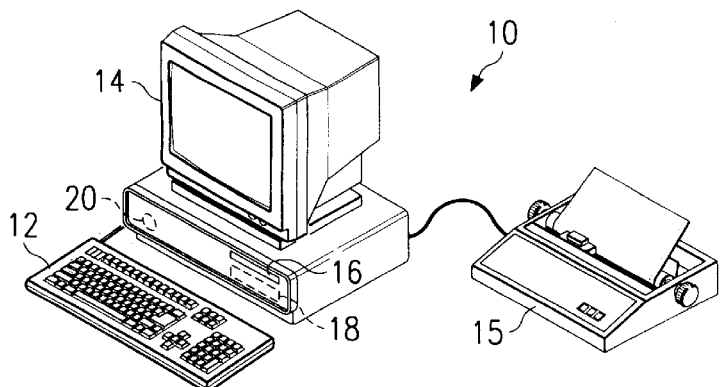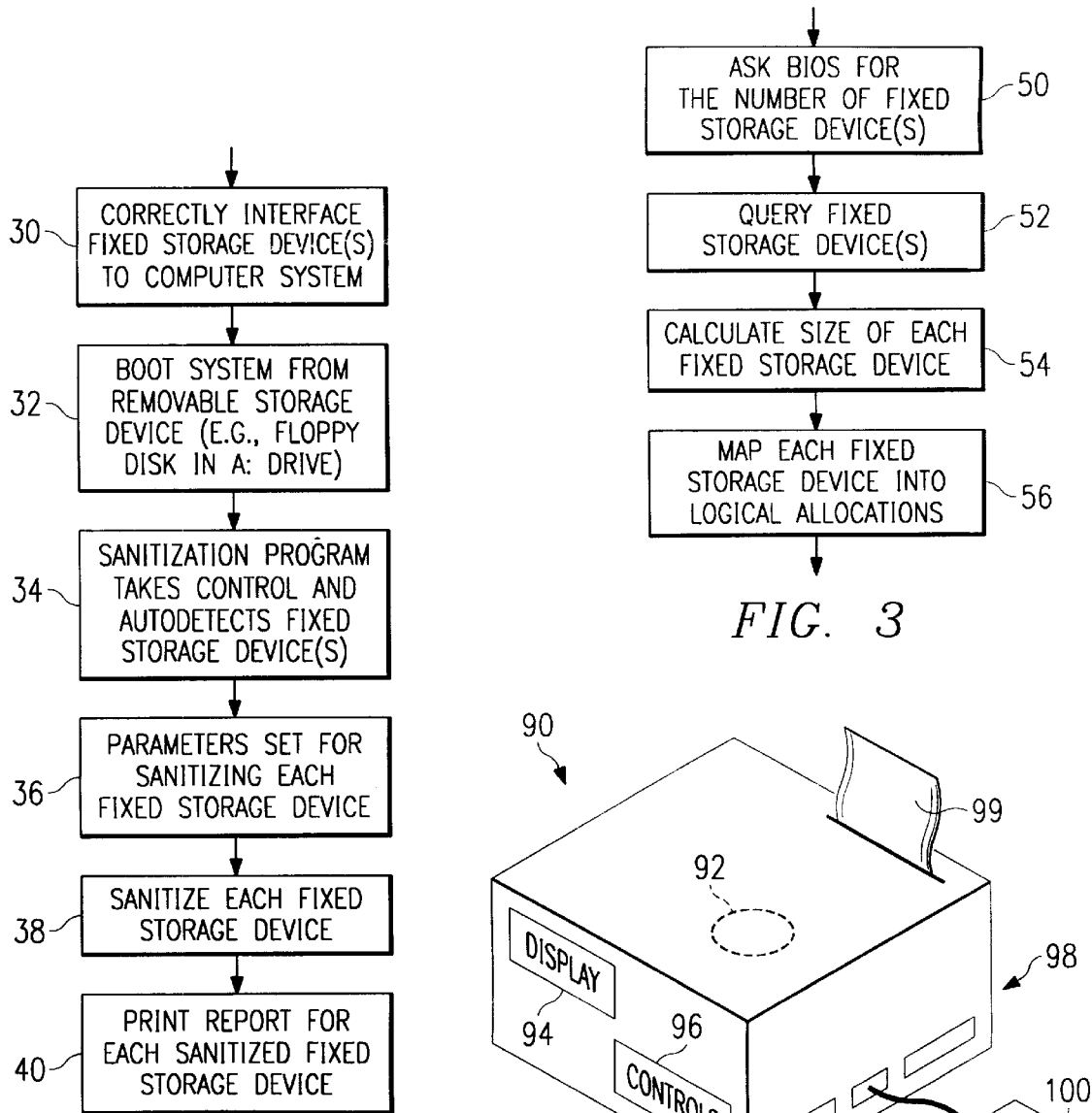

METHOD AND APPARATUS FOR SANITIZATION OF FIXED STORAGE DEVICES

TECHNICAL FIELD OF THE INVENTION

The present invention relates in general to the field of electronic systems, and more particularly to a method and apparatus for sanitization of fixed storage devices.

BACKGROUND OF THE INVENTION

One problem faced by organizations in various industries is what to do with fixed storage devices, such as hard disk drives, when they become obsolete or need to be transferred between personnel. This is particularly problematic where the storage devices have been used to store sensitive information. For example, in government and defense industry organizations, information stored on hard disk drives of computer system is often subject to high levels of security and access on a need-to-know basis. Once the hard disk drive has been used to store such information, the hard disk drive must be treated with special care. For example, simply reformatting the hard disk drive does not insure that the stored information is not recoverable. Thus, something more needs to be done to secure the device. One solution to securing a fixed storage device is to physically destroy the storage device such that any data stored thereon is unrecoverable. However, this is an understandably expensive and time consuming solution. Further, the task of transporting storage devices to a destruction facility can itself be a difficult logistical problem. In fact, because of these problems, some organizations actually maintain storage areas simply to hold large numbers of obsolete computer systems.

SUMMARY OF THE INVENTION

In accordance with the present invention, a method and apparatus for sanitization of fixed storage devices are disclosed that provide advantages over previously developed schemes for securing fixed storage devices.

According to one aspect of the present invention, a computer system having a fixed storage device interfaced thereto is booted from a removable storage device. The removable storage device holds a bootable disk operating system and program code that is executed within the disk operating system. The fixed storage device is detected. The writeable space of the fixed storage device is then overwritten with a plurality of overwrite layers. Further, a report can be printed listing information about the sanitization process contemporaneously upon the completion of sanitization. In one embodiment, sanitizing is accomplished using a plurality of patterns, each layer having an associated pattern, to ensure that data can not be recovered even by destructive analysis.

A technical advantage of the present invention is that a fixed storage device, such as a hard disk drive, attached to a computer system can be sanitized using a bootable removable storage device, such as a floppy disk, without other modification to the computer system. This allows organizations to easily secure computer systems so that they can be moved within the organization or resold to third parties without concern for sensitive data once stored on the fixed storage device.

Another technical advantage of the present invention is that a printed report can be created contemporaneously upon the completion of the sanitization process to provide information about the process. Further, the report provides a paper trail showing that the sanitization has been performed.

A further technical advantage is that a used fixed storage device, such as a hard disk drive, can be sanitized such that it is returned to its original factory low level format where information previously stored on the fixed storage device is not recoverable.

Additional technical advantages should be readily apparent from the drawings, description, and claims.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein:

FIG. 1 is a diagram of a computer system having an attached fixed storage device;

FIG. 2 is a flow chart of one embodiment of a method for sanitizing a fixed storage device according to the present invention;

FIG. 3 is a flow chart of one embodiment of a method for detecting fixed storage devices within the method of FIG. 2;

FIG. 5 is a diagram of one embodiment of an apparatus for sanitizing a fixed storage device component according to the present invention.

DETAILED DESCRIPTION OF THE INVENTION

Figure 4:
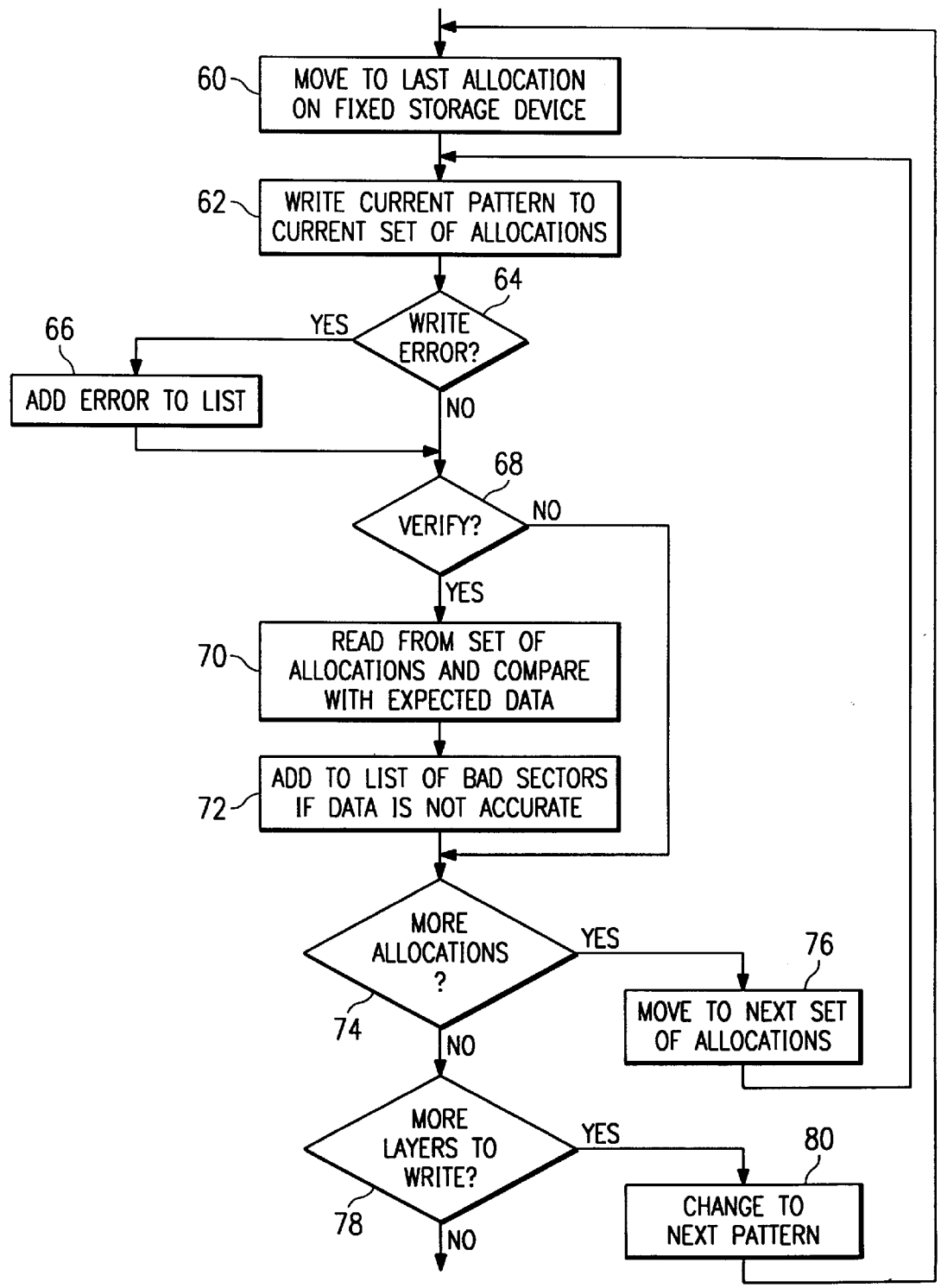
FIG. 4 is a flow chart of one embodiment of a method for performing sanitization within the method of FIG. 2.

FIG. 1 is a diagram of a computer system, indicated generally at 10, having an attached fixed storage device. Computer system 10 can be a personal computer, computer workstation or other computing device that has an attached fixed data storage. As shown, computer system 10 includes typical components such as a keyboard 12, a monitor 14, a printer 15, a floppy disk drive 16 and a hard disk drive 18. Computer system 10 further includes typical internal components, indicated generally at 20, such as a mother board, memory and expansion cards. Also, the motherboard of computer system 10 typically includes a processor, surrounding chipsets and a system BIOS. The system BIOS is generally configurable through a basic user interface and allows configuration of various parameters related to computer system 10, including parameters related to hard disk drive 18. In FIG. 1, hard disk drive 18 is shown as the only attached fixed storage device. It should be understood, however, that computer system 10 could have additional attached hard drives, SCSI storage devices and other types of fixed storage devices.

As mentioned above, hard disk drive 18, or other attached fixed storage devices, may have been used to store sensitive data. If computer system 10 is to be transferred within an organization or to third parties (rather than be physically destroyed), it can be necessary to sanitize the attached fixed storage devices to ensure that no previously stored information is recoverable. One way to sanitize a fixed storage device is to overwrite the space on the storage device with specified overwrite patterns to obscure the original data. The overwrite patterns can be random or pseudo-random data as well as defined character or data patterns. Further, a series of layers of overwrites can be performed in sequence with different specified patterns to ensure that the data can not be recovered even by destructive analysis of the fixed storage media.

Some existing file deletion products use overwrites to provide secure file deletion functions but operate within the environment of a standard operating system such as WINDOWS 95 or WINDOWS NT. A standard operating system typically is booted from, occupies and requires space on a fixed storage device. Consequently, that fixed storage device can not be completely sanitized by a program operating within the operating system environment.

FIG. 2 is a flow chart of one embodiment of a method for sanitizing a fixed storage device according to the present invention. In particular, the embodiment of FIG. 2 is directed to the sanitization of a hard disk drive attached to a computer system like that shown in FIG. 1. In step 30 of FIG. 2, one or more fixed storage device is correctly interfaced to the computer system. For example, this means that each attached hard disk drive is correctly setup in the computer system BIOS. Then, in step 32, the computer system is booted from a removable storage device, such as a floppy disk in the A: drive of the computer system. The removable storage device can hold both a bootable disk operating system (DOS) as well as sanitization program code that is executed with the disk operating system. In one embodiment, a floppy disk is used that includes CALDERA OPEN DOS as the operating system. After the computer system is booted up from the removable storage device, the sanitization program code is executed and takes control of the computer system in step 34. Also in step 34, the sanitization program autodetects all fixed storage devices physically attached and interfaced to the computer system. In general, this is accomplished through the system BIOS to identify all attached devices. One embodiment of this detection step is shown in and described with respect to FIG. 3.

The sanitization program next, in step 36, allows parameters to be set for sanitizing each detected fixed storage device. The parameters can include, for example, how many layers of overwrites to perform, which overwrite pattern to use in each layer, whether or not to verify overwrite data, and whether to print a written report. In one embodiment, the user can define up to 999 overwrite layers. Further, the parameters can be setup differently for each detected fixed storage device. As one alternative, step 36 can be skipped once the parameters have been defined or can allow parameters to be changed only after secure access (e.g., password protection). For example, an organization may want to have only management level employees setup the sanitization parameters. After setup, lower level employees could use the floppy disk to boot computer systems and sanitize attached fixed storage devices but not be allowed by the sanitization program to re-enter parameters.

In step 38, the sanitization program proceeds with sanitizing each of the fixed storage devices. In general, this process involves multiple layers of overwrites to the entire writeable space of the fixed storage device using different specified patterns to ensure that data can not be recovered even by destructive analysis. One embodiment of this sanitization step is shown in and described with respect to FIG. 4. After each fixed storage device is sanitized, a report can be printed in step 40. The report can list information about the sanitization process including who performed the sanitization, what device was sanitized, when the device was sanitized, a list of any errors or bad sectors, etc. The printed report can be created contemporaneously upon the completion of the sanitization process and provide a paper trail showing that the sanitization has been performed.

FIG. 3 is a flow chart of one embodiment of detecting fixed storage devices within step 34 of FIG. 2. In particular, the embodiment of FIG. 3 is directed to the detection of a hard disk drive attached to a computer system like that shown in FIG. 1. As shown, in step 50, the sanitization program first queries the system BIOS for the number of attached fixed storage devices. Then, in step 52, the sanitization queries the fixed storage devices identified in the system BIOS. The query can be accomplished, for example, through the system BIOS by an INT 13 call which will identify attached hard disk drives. This query returns information about the physical size of the attached devices. For example, with respect to a hard disk drive, the query provides the number of heads, cylinders and sectors on the hard drive. In step 54, the sanitization program calculates the physical size of each fixed storage device. For example, the physical size of a hard disk drive is typically given by:

(heads)×(cylinders)×(sectors)×(512)=number of bytes on drive.

After calculating the size of each device, the sanitization program, in step 56, maps each fixed storage device into logical allocations. For hard disk drives, the allocations are typically 512 bytes.

FIG. 4 is a flow chart of one embodiment of performing sanitization within step 38 of FIG. 2. This process is performed for each fixed storage device. In particular, the embodiment of FIG. 4 is directed to the sanitization of a hard disk drive attached to a computer system like that shown in FIG. 1. As shown, the sanitization program initiates the process, in step 60, by moving to the last allocation on the fixed storage device. In this embodiment, the process begins at the last allocation so that the boot sectors, which typically occupy the first part of the device, are overwritten last. If necessary, this may allow a user to halt the process before a device is mistakenly sanitized.

In step 62, the sanitization program writes the current overwrite pattern to a current set of allocations. In one implementation, the overwrite patterns include null, random, alternating and fixed character patterns. Further, the current set of allocations can be any number of allocations, but is typically sixteen or thirty-two allocations in the case of hard disk drives. The write operation of step 62 will typically return a code representing whether the write operation was successful. In step 64, the sanitization program checks whether a write error occurred. If so, the error is added to a list in step 66. Depending upon the level of security needed, such write errors may cause the sanitization process to be unsuccessful. In step 68, the sanitization program then checks whether the verify option has been enabled. If so, in step 70, the sanitization program reads data from the current set of allocations and compares the data with the expected data. This step verifies that the fixed storage device actually wrote the correct data to the storage media. In step 72, if any of the data read in step 70 is not accurate, the bad sectors are added to a list of bad sectors.

After either step 68 or step 72, the sanitization program continues at step 74 and checks whether there are more allocations to be overwritten in the current layer. If so, then in step 76, the sanitization program moves to the next set of allocations and returns to step 62. If in step 74 there are no more allocations, then the sanitization program moves to step 78 and checks whether there are more layers to be written to the fixed storage device. If so, the sanitization program changes to the next pattern in step 80 and returns to step 60. If in step 78, all layers have been written to the fixed storage device, then the sanitization process for that device is complete.

FIG. 5 is a diagram of one embodiment of an apparatus, indicated generally at 90, for sanitizing discrete fixed storage devices according to the present invention. Apparatus 90 includes internal components 92 that include a processor, memory and other typical computer system components. In addition, apparatus 90 includes embedded sanitization program code that is executed by apparatus 90 and operates essentially in the manner discussed above. Apparatus 90 also includes a display 94, controls 96 and connectors 98. For example, display 94 can be an LCD display, and controls 96 can be a keypad. Apparatus 90 further includes a printer 97 which can be, for example, a thermal printer. Connectors 98 can be an EIDE connector, SCSI device connector, or other suitable connector for attaching a fixed storage device component 100.

Apparatus 90 operates under the control of the sanitization program. Apparatus 90 can autodetect one or more fixed storage devices 100 connected to connectors 98. Apparatus 90 can then sanitize the fixed storage devices 100 using essentially the same process discussed above, although the sanitization program is embedded within apparatus 90 rather than being present on a bootable floppy disk. Apparatus 90 can allow a user to set up sanitization and other parameters and initiate detection and sanitization using controls 96. Apparatus 90 can also use printer 97 to print a written report providing information about completed sanitization. Apparatus 90 can be particularly useful for sanitizing fixed storage devices that are not already attached to and interfaced with a computer system.

Although the present invention has been described in detail, it should be understood that various changes, substitutions and alterations can be made hereto without departing from the spirit and scope of the invention as defined by the appended claims.

What is claimed is:

1. A method for sanitization of a fixed storage device, the fixed storage device interfaced to a computer system, comprising:

booting the computer system from a removable storage device, the removable storage device holding a bootable disk operating system and program code that is executed within the bootable disk operating system;

taking control of the computer system by the bootable disk operating system, detecting the fixed storage device interfaced to the computer system; and overwriting writeable space of the fixed storage device with a plurality of overwrite layers;

wherein overwriting is accomplished using a plurality of patterns, each layer having an associated pattern, to ensure that data can not be recovered even by destructive analysis; and wherein sanitizing comprises:

addressing a last set of allocations on the fixed storage device;

writing a current overwrite pattern to the addressed set of allocations;

checking whether a write error occurred and, if so, adding the error to a list;

reading data from the addressed set of allocations and comparing the data with expected data;

if any of the data read is not accurate, adding bad sectors to a list of bad sectors;

checking whether there are more allocations to be overwritten and, if so, addressing the next set of allocations and repeating writing, checking, reading and adding at the next set of allocations; and if there are no more allocations for a current overwrite layer, checking whether there are more overwrite layers to be performed and, if so, repeating writing, checking, reading, adding and checking.

2. The method of claim 1, further comprising printing a report listing information about the sanitization process contemporaneously upon the completion of sanitization.

3. The method of claim 2, wherein the information includes who performed the sanitization, what device was sanitized, when the device was sanitized, and a list of any errors or bad sectors.

4. The method of claim 1, wherein the fixed storage device is a hard disk drive that is correctly interfaced to the computer system by being setup in system BIOS.

5. The method of claim 1, wherein the removable storage device is a floppy disk in the A: drive of the computer system.

6. The method of claim 4, wherein detecting is accomplished through system BIOS.

7. The method of claim 1, wherein detecting comprises:

querying system BIOS for the number of the fixed storage device;

querying the fixed storage device identified by the system BIOS;

calculating a physical size of the fixed storage device; and mapping the fixed storage device into logical allocations.

8. The method of claim 1, further comprising setting parameters for sanitizing the detected fixed storage device.

9. The method of claim 8, wherein the parameters comprise how many overwrite layers and which overwrite patterns to use in each layer.

10. The method of claim 8, wherein setting parameters is skipped once the parameters have been set.

11. The method of claim 8, wherein setting parameters is allowed only after secure access.

12. A method for sanitization of a fixed storage device, the fixed storage device interfaced to a computer system, comprising:

booting the computer system from a removable storage device, the removable storage device holding a bootable disk operating system and program code that is executed within the bootable disk operating system;

taking control of the computer system by the bootable disk operating system, detecting the fixed storage device interfaced to the computer system; and overwriting writeable space of the fixed storage device with a plurality of overwrite layers;

wherein sanitizing comprises:

addressing a last set of allocations on the fixed storage device;

writing a current overwrite pattern to the addressed set of allocations;

checking whether a write error occurred and, if so, adding the error to a list;

reading data from the addressed set of allocations and comparing the data with expected data;

if any of the data read is not accurate, adding bad sectors to a list of bad sectors;

checking whether there are more allocations to be overwritten and, if so, addressing the next set of allocations and repeating writing, checking, reading and adding at the next set of allocations; and if there are no more allocations for a current overwrite layer, checking whether there are more overwrite layers to be performed and, if so, repeating writing, checking, reading, adding and checking.

13. The method of claim 12, wherein overwriting is accomplished using a plurality of patterns, each layer having an associated pattern, to ensure that data can not be recovered even by destructive analysis.

14. The method of claim 12, further comprising printing a report listing information about the sanitization process contemporaneously upon the completion of sanitization.

15. The method of claim 14, wherein the information includes who performed the sanitization, what device was sanitized, when the device was sanitized, and a list of any errors or bad sectors.

16. The method of claim 12, wherein the fixed storage device is a hard disk driver that is correctly interfaced to the computer system by being setup in system BIOS.

17. The method of claim 12, wherein the removable storage device is a floppy disk in the A: drive of the computer system.

18. The method of claim 16, wherein detecting is accomplished through system BIOS.

19. The method of claim 12, wherein detecting comprises:

querying system BIOS for the number of the fixed storage device;

querying the fixed storage device identified by the system BIOS;

calculating a physical size of the fixed storage device; and mapping the fixed storage device into logical allocations.

20. The method of claim 12, further comprising setting parameters for sanitizing the detected fixed storage device.

21. The method of claim 20, wherein the parameters comprise how many overwrite layers and which overwrite patterns to use in each layer.

22. The method of claim 20, wherein setting parameters is skipped once the parameters have been set.

23. The method of claim 20, wherein setting parameters is allowed only after secure access.

* * * * *